United States Patent [19]

Sekine

[11] Patent Number: 4,956,792

[45] Date of Patent: Sep. 11, 1990

[54] TARGET SIGNAL DETECTING APPARATUS

[76] Inventor: Matsuo Sekine, 3-3-37 Ogawa, Machida-shi, Tokyo, Japan

[21] Appl. No.: 356,616

[22] Filed: May 23, 1989

Related U.S. Application Data

[63] Continuation of Ser. No. 195,372, May 12, 1988, abandoned, which is a continuation of Ser. No. 65,113, Jun. 23, 1987, abandoned, which is a continuation of Ser. No. 755,581, Jul. 16, 1985, abandoned.

[30] Foreign Application Priority Data

Jul. 19, 1984 [JP] Japan ................... 59-148529

[51] Int. Cl.$^5$ ........................... G01S 7/28; G01S 7/66
[52] U.S. Cl. ........................... 364/517; 342/91
[58] Field of Search ................... 364/517; 342/91, 92, 342/93, 159, 160, 161, 162

[56] References Cited

U.S. PATENT DOCUMENTS

| 4,099,075 | 7/1978 | Goldberg et al. | 364/517 |
| 4,242,682 | 12/1980 | Musha et al. | 342/93 |
| 4,318,101 | 3/1982 | Musha et al. | 342/92 |
| 4,513,286 | 4/1985 | Irabu | 342/93 |
| 4,586,043 | 4/1986 | Wolf | 342/93 |

FOREIGN PATENT DOCUMENTS 61-28883 2/1986 Japan ................... 364/517

OTHER PUBLICATIONS

Sekine et al: Suppression of Weilbull Distributed Clutters using a Cell-Averaging Log/CFAR Receiver, IEEE Transactions on Aerospace and Electronics, vol. AES-14, No. 5, Sep. 1978, pp. 823-826.

Schleher: Radar Detection in Weibull Clutter, IEEE Trans on Aerospace and Electr. Systems, vol. AES-12, No. 6, Nov. 1976, pp. 736-743.

Goldstein: False Alarm Regulation in Log-Normal and Weilburg Clutter, IEEE Transactions on Aerospace and Electronics Sytems, vol. AES 9, No. 1, Jan. 1973, pp. 84-92.

Primary Examiner—Felix D. Gruber
Attorney, Agent, or Firm—Fleit, Jacobson, Cohn, Price, Holman & Stern

[57] ABSTRACT

A target signal detecting apparatus for discriminating and detecting a target signal from a noise signal having an amplitude characteristic which exhibits the Weibull distribution. A received signal whose amplitude intensity distribution is in accordance with the Weibull distribution with its probability density function Pc(x) given by the following $$Pc(x) = \frac{c}{b} \left(\frac{x}{b}\right)^{c-1} \exp\left[-\left(\frac{x}{b}\right)^c\right]$$

is subjected to logarithmic transformation so that a mean-square value $<y^2>$ of the amplitude of the logarithmically transformed received signal (y=lnx) and a square value $<y>^2$ of the mean are calculated and a distributed parameter C is calculated in accordance with the mean-square value $<y^2>$ and the square value $<y>^2$ of the mean as follows $$C = \frac{\pi}{\sqrt{6}} \cdot \frac{1}{\sqrt{<y^2> - <y>^2}}$$

Then, the calculated distributed parameter C is compared with a predetermined threshold so that if the distributed parameter C is greater than the threshold value, it is delivered as the distributed parameter corresponding to a target signal. Also, there are cases where the calculated distributed parameter C is amplified non linearly and then compared with the threshold.

24 Claims, 2 Drawing Sheets

TARGET SIGNAL DETECTING APPARATUS

This application is a continuation of application Ser. No. 07/194,372, filed 5-12-88, which was a continuation of application Ser. No. 07/065,113, filed 6-23-87, which as a continuation of application Ser. No. 755,581 filed 7-16-85 all now abandoned.

BACKGROUND OF THE INVENTION

1. Field of the Invention

The present invention relates to a target signal detecting apparatus for discriminating and detecting a target signal from a noise signal whose amplitude characteristic exhibits the Weibull distribution.

2. Description of the Prior Art

In recent years, it has been observed that various kinds of noise included in signals such as the noise included in a signal received by a radar due to the reflection of the transmitted signal from the surface of the sea and the noise included in a signal received by an ultrasonic detecting apparatus are distributed in accordance with the Weibull distribution as described for example in U.S. Pat. Nos. 4,242,682, 4,318,101 and 4,513,286, and in an article entitled "Suppression of WeibullDistributed Clusters Using a Cell-Averaging LOG/CFAR Receiver", co-authored by the inventor herein.

Assuming now that the amplitude intensity x of a signal X follows the Weibull distribution, the probability density function Pc(x) of the Weibull distribution is given as follows:

$$Pc(x) = \frac{c}{b}\left(\frac{x}{b}\right)^{c-1} \exp\left[-\left(\frac{x}{b}\right)^c\right] \quad (1)$$

where b is a constant determined by the nature of the signal and C a distributed parameter. This probability density function Pc(x) exhibits any one of various distribution forms depending on the value of the distributed parameter C. For example, it exhibits the exponential distribution when the value of the distributed parameter C is 1, the Rayleigh distribution when the value is 2 and the Gaussian distribution when the value is 2.5.

Where the amplitude of a target signal is smaller than the amplitude of a noise signal, the detection of the target signal is impossible by a conventional discrimination method in which a suitable amplitude threshold is established to discriminate the two signals from each other.

SUMMARY OF THE INVENTION

The present invention has been made to overcome the foregoing deficiency in the prior art and it is the primary object of the invention to provide a target signal detecting apparatus so designed that a target signal not following the Weibull distribution is detected from noise distributed in accordance with the Weibull distribution.

In accordance with the present invention there is thus provided a target signal detecting apparatus including logarithmic transformation means for logarithmically transforming a received signal X having an amplitude intensity distribution following the Weibull distribution with its probability density function Pc(x) given by the following $$Pc(x) = \frac{c}{b}\left(\frac{x}{b}\right)^{c-1} \exp\left[-\left(\frac{x}{b}\right)^c\right]$$

(where b and c are constants determined by the nature of the received signal), mean-square value computing means for calculating a mean-square value $<y^2>$ of the amplitude of the logarithmically transformed received signal Y, where y = ln x, square value computing means for calculating a square value $<y>^2$ of the mean of the logarithmically transformed received signal, distributed parameter computing means for calculating a distributed parameter means for calculating a distributed parameter value E, where $$E = \frac{\pi}{6} \cdot \frac{1}{\sqrt{<y^2> - <y>^2}}$$

in accordance with the mean-square value $<y^2>$ and the square value $<y>^2$ of the mean, and target signal detecting means for comparing the calculated distributed parameter with a predetermined threshold whereby if the distributed parameter is greater than the threshold, it is delivered as the distributed parameter corresponding to a target signal.

In accordance with one embodiment of the invention, the threshold of the target signal detecting means is established in accordance with a value $Z(Z=E^n)$ obtained by raising the distributed parameter E to nth power (where n is a number greater than or equal to 1 or $n \leq 1$) and a variance about the mean $<Z>$ of the value Z in such a manner that the false alarm rate or the probability of detection of the target signal attains a given value.

In accordance with another embodiment of the invention, the threshold has a value of $K \cdot <Z>$ representing a product of a constant K and a mean value $<Z>$ of the value Z ($Z=E^n$).

In accordance with still another embodiment of the invention, the threshold has a value of $K \cdot \sqrt{<Z^2>}$ representing a product of the constant K and a square root of a mean-square value $<Z^2>$ of the value Z ($Z=E^n$).

In accordance with still another embodiment of the invention, the threshold has a value of $K \cdot \sqrt{<Z^2> - <Z>^2}$ obtained by calculating a variance about the mean $<Z>$ of the value Z ($Z=E^n$) and then multiplying a square root of the variance by the constant K. Here, $<Z^2>$ represents a mean-square value of the value Z and $<Z>^2$ represents a square value of the mean of the value Z.

In accordance with still another embodiment of the invention, the threshold has a value of $<Z> + K \cdot \sqrt{<Z^2> - <Z>^2}$ obtained by calculating the variance about the mean $<Z>$ of the value Z ($Z=E^n$), obtaining the product of the square root of the variance and the constant K and then adding the mean $<Z>$ to the product.

In accordance with still another embodiment of the invention, the threshold has a value of $K \cdot \{<Z> + \sqrt{<Z^2> - <Z>^2}\}$ obtained by calculating the variance about a mean $<Z>$ of the value Z ($Z=E^n$), obtaining a sum of the square root of the variance and the mean $<Z>$ and then multiplying the sum by the constant K.

In accordance with still another embodiment of the invention, the threshold has a value of $K\cdot\langle Z\rangle + A$ obtained by obtaining a product of the constant K and the mean $\langle Z\rangle$ of the value Z ($Z=E^n$) and then adding a constant A to the product.

In accordance with still another embodiment of the invention, the threshold has a value of $K\cdot\sqrt{\langle Z^2\rangle}+A$ obtained by obtaining a product of the constant K and a square root of the mean-square value $\langle Z^2\rangle$ of the value $Z(Z=E^n)$ and then adding the constant A to the product.

In accordance with still another embodiment of the invention, the threshold has a value of $K\cdot\sqrt{\langle Z^2\rangle - \langle Z\rangle^2}+A$ obtained by calculating the variance abut the mean $\langle Z\rangle$ of the value $Z(Z=E^n)$, obtaining a product of the square root of the variance and the constant K and then adding the constant A to the product.

In accordance with still another embodiment of the invention, the threshold has a value of $\langle Z\rangle + K\cdot\sqrt{\langle Z^2\rangle - \langle Z\rangle^2}+A$ obtained by calculating the variance about the mean $\langle Z\rangle$ of the value $Z(Z=E^n)$, obtaining the product of the square root of the variance and the constant K, adding the mean $\langle Z\rangle$ to the product and then adding the constant A to the sum.

In accordance with still another embodiment of the invention, the threshold has a value of $K\cdot\{\langle Z\rangle + \sqrt{\langle Z^2\rangle - \langle Z\rangle^2}\}+A$ obtained by calculating the variance about the mean $\langle Z\rangle$ of the value Z ($Z=E^n$), producing a sum of a square root of the variance and the mean $\langle Z\rangle$, multiplying the sum of the square root of the variance and the mean by the constant K and then adding the constant A to the product.

In accordance with still another embodiment of the invention, there is further provided nonlinear amplifying means for generating a value $Z=E^n$ representing the distributed parameter E calculated by the distributed parameter computing means and raised to nth power (where is a number greater than or equal to 1 or $n \leq 1$), and the target signal detecting means compares the distributed parameter raised to nth power with a predetermined threshold whereby the distributed parameter raised to nth power and greater than the threshold is generated as the distributed parameter corresponding to a target signal.

In accordance with the present invention, the distributed parameter of an input signal exhibiting the Weibull distribution is detected so that since the magnitude of a distributed parameter corresponding to a target signal becomes greater than the magnitude of a distributed parameter corresponding to a noise signal, the establishment of a suitable threshold makes it possible to easily detect the target signal even if the amplitude of the target signal is lower than the amplitude of the noise signal.

Preferred embodiments of the invention will be described in greater detail with reference to the accompanying drawings.

DESCRIPTION OF THE PREFERRED EMBODIMENTS

Figure 3:
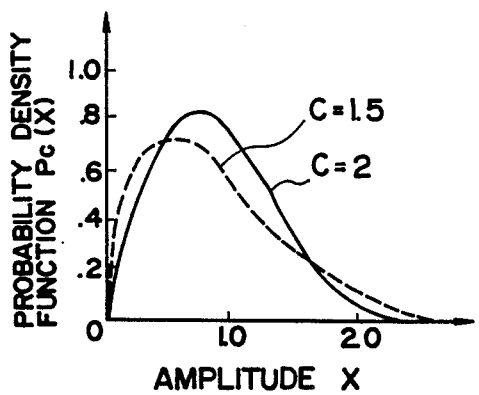
FIG. 3 is a graph showing examples of the variation with the amplitude X of the probability density function Pc(X).
Figure 4:
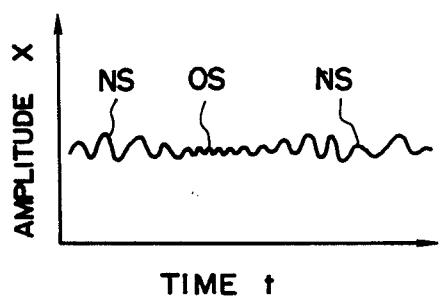
FIG. 4 is a graph showing the variation with time t of the amplitude X of a received signal.

Firstly, FIG. 3 illustrates some examples of the probability density function shown by the above equation (1). In the Figure, the broken line and the solid line respectively show the probability density functions Pc(x) respectively corresponding to the distributed parameters of E=1.5 and E=2. Also, FIG. 4 is a graph showing the variation of the amplitude x (the ordinate) of a received signal including a target signal OS and noise signals NS in a time sequence with the time t (the abscissa). If the amplitude of the target signal OS is lower than the amplitude of the noise signal as shown in FIG. 4, it is impossible to detect the target signal OS by the conventional method in which a suitable threshold is established to discriminate the target signal OS and the noise signal NS from each other.

Next, the signal processing theory of the target signal detecting apparatus according to the invention will be described.

An input signal X having an amplitude intensity x following the Weibull distribution with its probability density function Pc(x) given by the previously mentioned equation (1) or the following:

$$Pc(x) = \frac{c}{b}\left(\frac{x}{b}\right)^{c-1} \exp\left[-\left(\frac{x}{b}\right)^c\right] \quad (1)$$

is logarithmically transformed and the resulting output y is given by $y = \ln x$ (2)

Then, a mean-square value $\langle y^2 \rangle$ of the output y becomes as follows:

$$\langle y^2 \rangle = \int_0^\infty \ln^2 x \cdot Pc(x)dx \quad (3)$$
$$= \ln^2 b - \frac{2\gamma}{c}\ln b + \frac{\gamma^2}{c^2} + \frac{\pi^2}{6c^2}$$

Here, $\gamma$ is the Euler constant and its value is 0.5772...

Also, a mean value $\langle y \rangle$ of the output y becomes as follows:

$$\langle y \rangle = \int_0^\infty \ln x \cdot Pc(x)dx \quad (4)$$
$$= \ln b - \frac{\gamma}{c}$$

Thus, a square value $\langle y \rangle^2$ of the mean of the output y becomes as follows:

$$\langle y \rangle^2 = \ln^2 b - \frac{2\gamma}{c}\ln b + \frac{\gamma^2}{c^2} \quad (5)$$

Therefore, a variance E(y) about the mean of the output y is given by the following equation (5) since it is the difference between the mean-square value $<y^2>$ of the output y and the square value $<y>^2$ of the mean of the output y $$E(y) = <y^2> - <y>^2 \qquad (6)$$
$$= \frac{\pi^2}{6c^2}$$

Then, a distributed parameter E becomes as follows $$E = \frac{\pi}{\sqrt{6}} \cdot \frac{1}{\sqrt{<y^2> - <y>^2}} \qquad (7)$$

Figure 1:
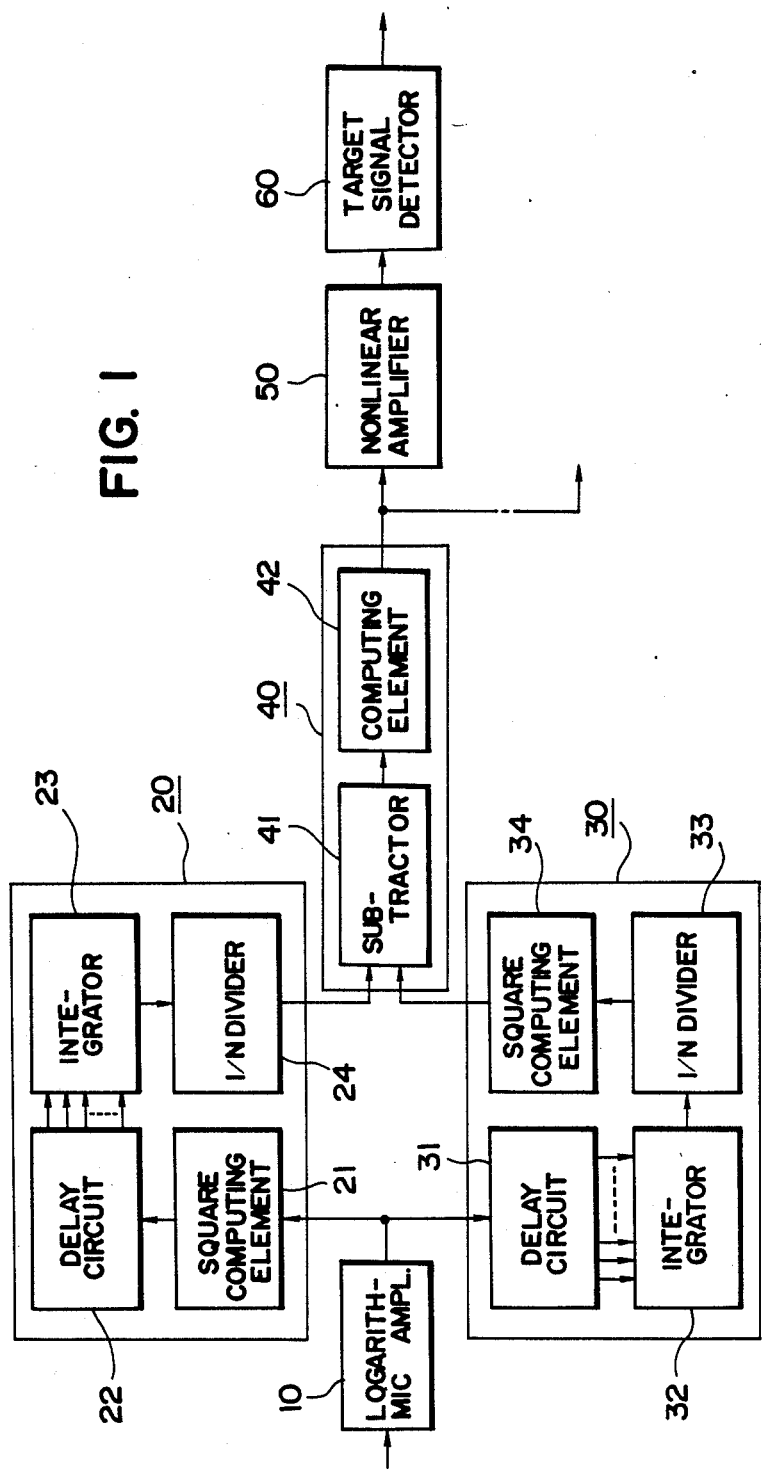
FIG. 1 is a block circuit diagram of a target signal detecting apparatus according to the invention.

Referring now to FIG. 1, there is illustrated a block circuit diagram of the target signal detecting apparatus according to the invention. In the Figure, a logarithmic amplifier 10 (logarithmic transformation means) logarithmically transforms the signal shown in Fig. 4 or the received signal X having an amplitude x so that a signal Y having an amplitude $y = \ln x$ is generated and the signal Y is then applied to mean-square value computing means 20 and square value computing means 30 of the mean value. According to a preferred embodiment, the logarithimically transformed signal Y generated may be a digitally converted sequence of signals indicative of signal amplitude as disclosed in U.S. Pat. No. 4,318,101 to Mush et al, aforementioned. The mean-square value computing means 20 disclosed by way of example as part of a parameter calculator in the Musha et al patent, includes a square computing element 21, a delay circuit 22 composed for example of a shift register or the like, an integrator 23 and a divider 24 and it computes a mean-square value $<y^2>$ of the signal Y as shown by the equation (3). In other words, the square computing element 21 squares the amplitude y of the signal Y to produce an amplitude $y^2$ and the delay circuit 22 samples and quantizes the signal Y to extract N (N is a natural number) sampled values $y_1^2, y_2^2, —, y^2N$ corresponding to the amplitude $y^2$ of the signal Y. The integrator 23 calculates an integrated value $$\sum_{i=1}^{N} y_i^2$$

of the N sampled values $y_1^2, y_2^2, —, y_N^2$ and then the divider 24 divides the integrated value $$\sum_{i=1}^{N} y_i^2$$

by N to calculate a meansquare value $<y^2>$ of the signal Y as follows:

$$<y^2> = \frac{1}{N} \sum_{i=1}^{N} y_i^2 \qquad (3a)$$

On the other hand, the square value computing means 30 of the mean value includes a delay circuit 31, an integrator 32, a divider 33 and a square computing element 34 and it calculates a square value $<y>^2$ of the mean of the signal Y as shown by the equation (5). In other words, the delay circuit 31 samples and quantizes the signal Y to extract N sampled values $y_1, y_2, —, y_N$ corresponding to the amplitude y of the signal Y and the integrator 32 calculates * an integrated value $$\sum_{i=1}^{N} Y_i$$

of the N sampled values $y_1, y_2, —, y_N$. Then, the divider 33 divides the integrated value $$\sum_{i=1}^{N} Y_i$$

by N to calculate a mean value $$\frac{1}{N} \sum_{i=1}^{N} y_i$$

of the integrated value $$\sum_{i=1}^{N} Y_i$$

and then the square value computing element 34 squares the mean value $$\frac{1}{N} \sum_{i=1}^{N} Y_i$$

to calculate a square value $<y>^2$ of the mean value of the signal Y as follows:

$$<y>^2 = \left( \frac{1}{N} \sum_{i=1}^{N} Y_i \right)^2 \qquad (5a)$$

Then, distributed parameter computing means 40 including a subtracter 41 and a computing element 42 calculates a distributed parameter E in accordance with the mean-square value and the square value of the mean value. This distributed parameter E is calculated in a manner that the subtracter 41 calculates a variance E(y) about the mean of the signal Y as shown by the equation (6) and then the computing element 42 calculates a square root $\sqrt{<y^2> - <y>^2}$ of the variance $E(y) = <y^2> - <y>^2$, calculates a reciprocal $1/\sqrt{<y^2> - <y>^2}$ of the square root and then multiplies the thus obtained reciprocal by a constant $\pi/\sqrt{6}$.

Figure 2:
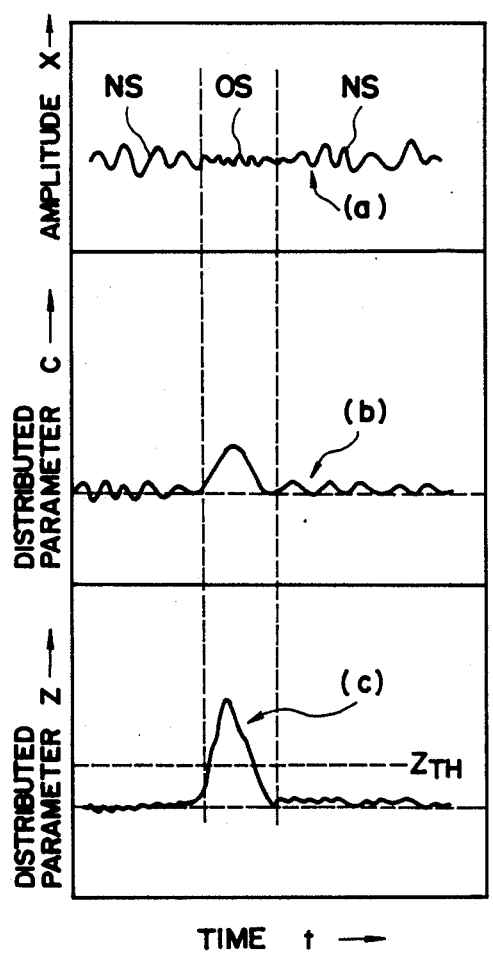
FIG. 2 is a graph showing the variation (a) with time t of the amplitude X, (b) distributed parameter E and (c) distributed parameter Z raised to nth power ($n \leq 1$) of a received signal.

FIG. 2 shows the distributed parameter E obtained in the above-mentioned manner. In the Figure, even if the signal X applied to the logarithmic amplifier 10 is such that a target signal OS is lower in amplitude than noise signals NS (See the curve (a) in FIG. 2), the distributed parameter E generated from the distributed parameter computing means 40 has a greater value in the portion corresponding to the target signal OS and has substantially a constant value with small variations (See the curve (b) in FIG. 2) in the portions corresponding to the noise signals making it easy to detect the distributed parameter E corresponding to the target signal OS.

In this embodiment, the distributed parameter E corresponding to the target signal OS is applied to a nonlinear amplifier 50 (nonlinear amplifying means) so as to make easier the detection of the distributed parameter E.

The nonlinear amplifier 50 raises the distributed parameter E to nth power (where n is a number greater than or equal to 1 or $n \leq 1$) and generates a new distributed parameter Z ($Z = E^n$) It is to be noted that a square amplifier with n=2 or the like is well known as a specific example of the nonlinear amplifier 50. With the new distributed parameter Z generated from the nonlinear amplifier 50, as shown by the curve (c) in FIG. 2, the variations of the portions corresponding to the noise signals NS are suppressed and the portion corresponding to the target signal OS is amplified considerably as compared with the distributed parameter E (See the curve (b) in FIG. 2) thus further simplifying the detection of the distributed parameter Z corresponding to the target signal OS or the establishment of a threshold value.

Then, a target signal detector 60 (target signal detecting means) compares the new distributed parameter Z generated from the nonlinear amplifier 50 and a threshold $Z_{TH}$ preset manually or automatically in the target signal detector 60 so that the distributed parameter Z greater than the threshold $Z_{TH}$ is delivered as one corresponding to the target signal.

While the threshold Z is preset manually or automatically as mentioned previously, the manual presetting is effected while observing the distributed parameter Z on the display screen of an A scope, B scope, PPI scope or the like. On the other hand, the automatic presetting is effected by calculating a mean value $<Z>$ of the distributed parameter Z and a variance Var about the mean value $<Z>$ and then selecting a suitable threshold value in accordance with the calculated mean value $<Z>$ and variance Var such that the false alarm rate that a noise signal NS is detected mistakenly for a target signal OS or the detection probability of target signal OS attains a given value.

The method of calculating the threshold $Z_{TH}$ will now be described. If P(Z) represents the probability density function of the distributed parameter Z, then the mean value $<Z>$ and the mean-square value $<Z^2>$ of the distribute parameter Z respectively become as follows:

$$<Z> = \int_0^\infty Z \cdot P(Z)dZ \tag{8}$$

$$<Z^2> = \int_0^\infty Z^2 \cdot P(Z)dZ \tag{9}$$

Then, the variance Var about the mean $<Z>$ of the distributed parameter Z becomes as follows $$Var = <Z^2> - <Z>^2 \tag{10}$$

Also, the false alarm rate Pfa becomes as follows:

$$Pfa = \int_{Z_{TH}}^\infty P(Z)dZ \tag{11}$$

where $Z_{TH}$ is the threshold. Then, where the amplitude t of a target signal OS is superposed on the distributed parameter Z, the detection probability Pa of the target signal OS becomes as follows:

$$Pa = \int_{Z_{TH}}^\infty P(Z + t)d(Z + t) \tag{12}$$

Thus, the threshold is established in such a manner that the false alarm rate Pfa or the detection probability Pa attains the desired value.

Specific values of the threshold $Z_{TH}$ calculated in the above-mentioned manner will now be described. In other words, by letting $<Z>$ represent the mean value of the distributed parameter Z, $<Z^2>$ the mean-square value, $<Z>^2$ the square value of the mean value Z, $<Z^2> - <Z>^2$ the variance about the mean value $<Z>$ and K a constant (K is any of given constants including 1) and considering the mean value $<Z>$, the mean-square value $<Z^2>$ and the variance $<Z^2> - <Z>^2$ as the amplitude levels of the noise signals, the threshold $Z_{TH}$ is given by any one of the following expressions (13) to (17)

$$K \cdot <Z> \tag{13}$$

$$K \cdot \sqrt{<Z^2>} \tag{14}$$

$$K \cdot \sqrt{<Z^2> - <Z>^2} \tag{15}$$

$$<Z> + K \cdot \sqrt{<Z^2> - <Z>^2} \tag{16}$$

$$K \cdot \{<Z> + \sqrt{<Z^2> - <Z>^2}\} \tag{17}$$

Also, using a constant A, the threshold $Z_{TH}$ may be established in accordance with any one of the following expressions (18) to (22) in addition to those shown by the above expressions (13) to (17)

$$K \cdot <Z> + A \tag{18}$$

$$K \cdot \sqrt{<Z^2>} + A \tag{19}$$

$$K \cdot \sqrt{<Z^2 22> - <Z>^2} + A \tag{20}$$

$$<Z> + K \cdot \sqrt{<Z^2> - <Z>^2} + A \tag{21}$$

$$K \cdot \{<Z> + \sqrt{<Z^2> - <Z>^2}\} + A \tag{22}$$

In short, it is only necessary to establish the threshold $Z_{TH}$ in such a manner that the false alarm rate Pfa or the detection probability Pa attains the desired value.

It is to be noted that while the respective component parts of this embodiment are provided by means of electric circuitry, they may also be provided by means of a microcomputer or the like.

What is claimed is:

1. A target signal detecting apparatus comprising: logarithmic transformation means for logarithmically transforming a received signal X having an amplitude intensity distribution which follows Weibull distribution having a probability density function Pc(x) given by the expression:

$$\frac{c}{b}\left(\frac{x}{b}\right)^{c-1} \exp\left[-\left(\frac{x}{b}\right)^c\right],$$

where b and c are constants which are determined by the nature of said received signal;
  mean-square value computing means for calculating a meansquare value computing means for calculating a meansquare value $<y^2>$ of an amplitude of said logarithmically transformed received signal $y = \ln x$; square value computing means for calculating a square value $<y>^2$ of the mean of said logarithmically transformed received signal; distributed parameter computing means for calculating a distributed parameter E in accordance with said mean square value $<y^2>$ and said square value $<y>^2$ of said mean, where E follows the expression:

$$\frac{\pi}{\sqrt{6}} \cdot \frac{1}{\sqrt{<y^2> - <y>^2}} \text{; and}$$

target signal detecting means for comparing said calculated distributed parameter E with a predetermined threshold to detect a target signal when said distributed parameter E is greater than said threshold.

2. The apparatus as defined in claim 1, A target signal detecting apparatus comprising: logarithmic transformation means for logarithmically transforming a received signal X having an amplitude intensity distribution following a Weibull distribution with its probability density function Pc(x) given by the following $$Pc(x) = \frac{c}{b}\left(\frac{x}{b}\right)^{c-1} \cdot \exp\left[-\left(\frac{x}{b}\right)^c\right]$$

(where B and C are constants which are determined by the nature of said received signal); mean-square value computing means for calculating a mean-square value $<y^2>$ of an amplitude of said logarithmically transformed received signal $y = \ln x$; square value computing means for calculating a square value $<y>^2$ of a mean of said logarithmically transformed received signal; distributed parameter computing means for computing the following distributed parameters in accordance with said mean-square value $<y^2>$ and said square value $<y>^2$ of said mean $$C = \frac{\pi}{\sqrt{6}} \cdot \frac{1}{\sqrt{<y^2> - <y>^2}}$$

including nonlinear amplifying means for generating said predetermined threshold value as $Z = E^n$ by raising said calculated distributed parameter E to nth power (where n is a number greater than or equal to 1 ($n \leq 1$)).

3. An apparatus according to claim 2, wherein in accordance with said value $Z(Z = E^n)$ and a variance about a mean $<Z>$ of said value $Z(Z = E^n)$, the threshold of said target signal detecting means is predetermined such that the false alarm rate or the probability of detection of said target signal attains a predetermined value.

4. An apparatus according to claim 3, wherein said threshold has a value of K19 $<Z>$ obtained by multiplying the mean $<Z>$ of said value $Z(Z = E^n)$ by a constant K.

5. An apparatus according to claim 3, wherein said threshold has a value of $K \cdot \sqrt{<Z^2>}$ obtained by multiplying a square root of a mean-square value $<Z^2>$ of said value $Z(Z = E^n)$ by a constant K.

6. An apparatus according to claim 3, wherein said threshold has a value of $K \cdot \sqrt{<Z^2> - <Z>^2}$ obtained by calculating a variance about the mean $<Z>$ of said value Z ($Z = E^n$) and then multiplying a square root of said variance by a constant K (where $<Z^2>$ represents a mean-square value of said value Z and $<Z>^2$ represents a square value of the mean of said value Z).

7. An apparatus according to claim 3, wherein said threshold hold has a value of $<Z> + K \cdot \sqrt{<Z^2> - <Z>^2}$ obtained calculating a variance about the mean $<Z>$ of said value Z ($Z = E^n$), obtaining a product of a square root of said variance and a constant K and then adding said mean $<Z>$ to said product (where $<z^2>$ represents a mean-square value of said value Z and $<Z>^2$ represents a square value of the mean of said value Z).

8. An apparatus according to claim 3, wherein said threshold has a value of $K \cdot \{<Z> + \sqrt{<Z^2> - <Z>^2}\}$ obtained by calculating a variance about the mean $<Z>$ of said value Z ($Z = E^n$), adding said mean $<Z>$ to a square root of said variance and then multiplying said sum by a constant K (where $<Z^2>$ represents a mean-square value of said value Z and $<Z>$ represents a square value of the mean of said value Z).

9. An apparatus according to claim 3, wherein said threshold has a value of $K \cdot <Z> + A$ obtained by adding a constant A to a product of the mean $<Z>$ of said value Z ($Z = E^n$) and a constant K.

10. An apparatus according to claim 3, wherein said threshold has a value of $K \cdot \sqrt{<Z^2>} + A$ obtained by adding a constant A to a product of a square root of a mean-square value $<Z^2>$ of said value $Z(Z = E^n)$ and a constant K.

11. An apparatus according to claim 3, wherein said threshold has a value of $K \cdot \sqrt{<Z^2> - <Z>^2} + A$ obtained by calculating a variance about the mean $<Z>$ of said value $Z(Z = E^n)$, obtaining a product of a square root of said variance and a constant K and then adding a constant A to said product (where $<Z^2>$ represents a mean-square value of said value Z and $<Z>^2$ represents a square value of the mean of said value Z).

12. An apparatus according to claim 3, wherein said threshold has a value of $<Z> + K \cdot \sqrt{<Z^2> - <Z>^2} + A$ obtained by calculating a variance about the mean $<Z>$ of said value $Z(Z = E^n)$, obtaining a product of a square root of said variance and a constant K, adding said mean $<Z>$ to said product and then adding a constant A to said sum (where $<Z^2>$ represents a mean-square value of said value Z and $<Z>^2$ represents a square value of the mean of said value Z).

13. An apparatus according to claim 3, wherein said threshold has a value of $K \cdot \{<Z> + \sqrt{<Z^2> - <Z>^2}\} + A$ obtained by calculating a variance about the mean $<Z>$ of said value Z ($Z = E^n$), obtaining a sum of said mean $<Z>$ and a square root of said variance, obtaining a product of said sum and a constant K and then adding a constant A to said product (where $<Z^2>$ represents a mean-square value of said value Z and $<Z>$ represents a square value of the mean of said value Z).

14. A method of detecting a target signal in a logarithmically transformed signal input (Y) having an amplitude intensity following a Weibull distribution, said method comprising the steps of:

logarithmically transforming a received signal having an amplitude intensity distribution following the Weibull distribution having a probability density function Pc(x) given by the following expression:

$$\frac{c}{b}\left(\frac{x}{b}\right)^{c-1} \exp\left[-\left(\frac{x}{b}\right)^c\right]$$

, where b and c are constants determined by the received signal;

calculating a first mean value of said signal input ($<Y>$);

squaring said first mean value to derive a first mean value squared ($<Y>^2$);

calculating a second mean value of said signal input squared ($<y^2>$);

computing a distribution parameter value (E) as a function of the first mean value squared ($<Y>^2$) and the second mean value ($<Y^2>$) by the expression $$E = \frac{\pi}{\sqrt{6}} \cdot \frac{1}{\sqrt{<y^2> - <y>^2}};$$

providing a predetermined threshold value;

comparing said computed distribution parameter value (E) with said predetermined threshold value; and detecting the target signal when the computed distribution parameter value (E) exceeds the threshold value.

15. The method according to claim 14, wherein the step of providing said predetermined threshold value further comprises the steps of computing the square of said distribution parameter, computing the mean of said squared distribution parameter, and computing the product of said mean and a constant K.

16. The method according to claim 14, wherein the step of providing predetermined threshold value further comprises the steps of twice computing the square of said distribution parameter, computing the mean of said twice squared distribution parameter, computing the square root of the mean, and computing the product of the square root and a constant K.

17. The method according to claim 14, wherein said step of providing said predetermined threshold value further comprises the steps of computing the square of said distribution parameter, calculating the mean of said square, computing the variance about said mean, computing the square root of said variance, and multiplying the square root of said variance by a constant K.

18. The method according to claim 14, wherein the step of providing said predetermined threshold value further comprises the steps of computing the square of said distribution parameter about said mean, computing the mean of said square, computing the variance, computing the square root of the variance, computing the product of the square root of the variance and a constant K, and adding the mean to the product.

19. The method according to claim 14, wherein said step of providing said predetermined threshold value further comprises the steps of computing the square of said distribution parameter, computing the mean of said square, calculating a variance about the mean, computing the square root of said variance, summing said mean and the square root of said variance, and computing the product of said sum of the mean and the square root of said variance and a constant K.

20. The method according to claim 19, wherein the step of providing said predetermined threshold value further comprises the step of adding a constant A to said product.

21. The method according to claim 14, wherein the step of providing said predetermined threshold value further comprises the steps of computing the square of the distribution parameter, computing the mean of the square, computing the product of the mean and a constant K, adding a constant A to the product of the mean and the constant K.

22. The method according to claim 14, wherein the step of providing said predetermined threshold value further comprises the steps of twice computing the square of said distribution parameter, computing the mean of said twice squared distribution parameter, computing the square root of the mean, computing the product of the square root and a constant A, and adding a constant A to the product of the square root and the constant K.

23. The method according to claim 14, wherein the step of providing said predetermined threshold value further comprises the steps of computing the square of said distribution parameter, computing the mean of said square, computing the variance about said mean, computing the square root of said variance, computing the product of the square root of the variance and a constant K, adding a constant K to said product.

24. The method according to claim 14, wherein said step of providing said predetermined threshold value further comprises the steps of computing the square of said distribution parameter, calculating the mean of said square, computing the variance about the mean, computing the square root of said variance, multiplying the square root of said variance by a constant K, summing said mean and the product of said constant K and the square root of said variance, and adding a constant A to said sum.

* * * * *